United States Patent [19]
Murano et al.

[11] Patent Number: 5,678,974
[45] Date of Patent: Oct. 21, 1997

[54] SYSTEM FOR STORING A CARRYING TRUCK

[75] Inventors: Toshio Murano; Takashi Nezu; Hiroyuki Shibahata, all of Akishima, Japan

[73] Assignee: Tachi-S Co., Ltd., Tokyo, Japan

[21] Appl. No.: 524,779

[22] Filed: Sep. 7, 1995

[51] Int. Cl.$^6$ ............................................. B65G 47/00
[52] U.S. Cl. ..................... 414/362; 414/370; 414/402; 414/577
[58] Field of Search ..................... 414/354, 355, 414/362, 370, 373, 401, 402, 572, 577, 584, 590, 609; 104/35, 37, 273; 198/414

[56] References Cited

U.S. PATENT DOCUMENTS

| | | | |
|---|---|---|---|
| 1,801,180 | 4/1931 | Tacvorian | 414/362 X |
| 4,298,305 | 11/1981 | Neth | 104/37 X |
| 4,326,624 | 4/1982 | Ewertowski et al. | 104/35 X |
| 4,597,334 | 7/1986 | Jacoby | 104/35 X |
| 4,941,794 | 7/1990 | Hara et al. | 414/401 X |
| 5,127,336 | 7/1992 | Wakabayashi | 104/35 |
| 5,350,077 | 9/1994 | Nezu et al. | 180/168 X |
| 5,391,046 | 2/1995 | Colamussi | 414/584 X |
| 5,498,117 | 3/1996 | Nezu | 414/355 |

FOREIGN PATENT DOCUMENTS

| | | | |
|---|---|---|---|
| 7/43127 | 8/1995 | Japan | |
| 0397337 | 9/1973 | U.S.S.R. | 414/609 |
| 1074779 | 2/1984 | U.S.S.R. | 198/414 |

*Primary Examiner*—James W. Keenan
*Attorney, Agent, or Firm*—Browdy and Neimark

[57] ABSTRACT

A system for storing a carrying truck uncoupled from a self-propelled truck moving along a given passage. So that such uncoupled carrying truck may be stored at a storage area outside and angular relative to the passage, the system includes a direction change device disposed at a point of the passage where the carrying truck is uncoupled from the self-propelled truck, and a truck hitching device disposed in the storage area such as to orient towards that point of passage. The direction change device includes a rotary disc member and an elevating element for raising the carrying truck and orienting the same towards the storage area. The truck hitching device includes fore-and-aft movable elements for hitching and drawing the carrying truck which has been changed its direction by the direction change device, towards the storage area.

15 Claims, 6 Drawing Sheets

SYSTEM FOR STORING A CARRYING TRUCK

BACKGROUND OF INVENTION

1. Field of Invention

The present invention concerns a system in which a carrying truck is moved along a passage by a self-propelled truck coupled therewith to transfer articles or goods to a predetermined destination. In particular, the present invention is directed to a system for storing a carrying truck uncoupled from a self-propelled truck, at a given storage area where it is parked or stored, with such arrangement that the carrying truck, after being uncoupled from the self-propelled truck, will automatically change its direction from the passage towards that storage area and then brought thereto.

2. Description of Prior Art

In a line of automation assembling process, some factories or facilities employ a unmanned system for transferring articles or goods, such as assembled products, to a predetermined destination, wherein a self-propelled truck coupled with a carrying truck on which the articles are loaded, moves automatically along a given passage and stops at the destination. The carrying truck is then uncoupled from the self-propelled truck, permitting the articles to be unloaded therefrom. One example of such system has been disclosed in the U.S. Pat. No. 5,350,077. Reference may be made thereto for the detailed information thereof.

The carrying truck, when having been uncoupled from the self-propelled truck, aught to be drawn to a storage area set at a point apart from the passage, and stored there, so that the articles may be unloaded therefrom.

Figure 1:
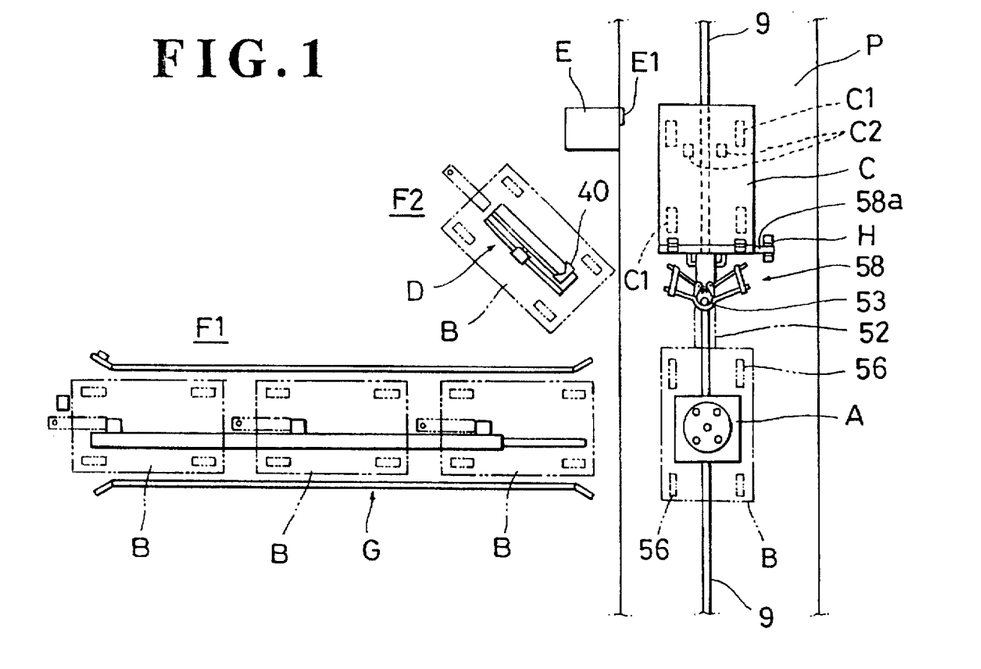
FIG. 1 is a schematic plan view which generally shows a system for storing a carrying truck in accordance with the present invention.

Conventionally, the operations for storing the carrying truck have been effected manually by workers. During the operations, the workers have to orient, with their hands, the carrying truck toward the storage area. Further, there are two different storage areas arranged as shown in FIG. 1, one of which, at (F1), is disposed by 90 degrees relative to a passage (P) and another of which, at (F2), is disposed by 45 degrees relative thereto. In this instance, much labor is imposed upon the workers to orient and bring each of carrying truck (B) toward one of those two differently angled storage areas (F1)(F2), depending upon the kinds of articles loaded on the carrying truck.

In particular, as can be seen in FIG. 1, the storage area (F2) angled by 45 degrees relative to the path (P) is inevitably situated at a narrow space between another storage area (F1) and the passage (P) or an adjacent control device (E). This will however make it difficult to install a sophisticated storing system in such narrow space, because its dimensions must be increased generally due to a number of mechanical and electronic elements contained therein to insure drawing the carrying truck (B) to the 45-degree angled narrow storage area (F2) and precisely store it there.

In the circumstances mentioned above, there has been no other good way than to require the hands of workers to manually orient and bring the carrying truck uncoupled from the self-propelled truck, towards such narrow storage area angled by 45 degrees relative to the passage.

SUMMARY OF THE INVENTION

In view of the above-stated drawbacks, it is therefore a primary purpose of the present invention to provide an improved system of storing a carrying truck, which permits unmanned, an automated direction change and hitching of a carrying truck uncoupled from a self-propelled truck, towards a storage area defined at a different point from a passage on which the carrying truck is moved by the self-propelled truck.

In order to achieve such purpose, in accordance with the present invention, there is basically provided a system comprising:

a direction change means for changing a direction of a carrying truck uncoupled from a self-propelled truck, the direction change means including:
- a rotary means for rotating and orienting the carrying truck towards a predetermined storage area, the rotary means having a rotation surface generally flush with an upper surface of a passage; and
- an elevating means for raising and lowering the carrying truck from and to the passage, the elevating means being provided at the rotary means, and a hitching means for hitching and drawing the carrying truck, which has been changed in direction from the passage by the direction change means, in a direction from the direction change means towards the storage area.

As one aspect of the invention, in the case where the storage area is defined angularly relative to a point of the passage where the carrying truck is uncoupled from the self-propelled truck, the hitching means may be so disposed in the storage area as to orient, at a corresponding angle, towards such point of passage. For a typical example, if the storage area is defined at the angle of 45 degrees relative to that point of passage, the hitching means in the storage area should be oriented at the same 45-degree angle in the direction thereto.

It is a second purpose of the present invention to simplify and minimize the structure of the foregoing hitching means so that it may be installed in a small or narrow area.

To attain that purpose, the hitching means may comprise a base member, a drive source disposed adjacent to the base member, and a movable means having a hook means to be engageable with the carrying truck, the movable means being provided movably within the base member, wherein the movable means is operatively connected to the drive source. More preferably, the drive source of such hitching means may comprise a drive element including a rectilinear tubular member and a movable block member movable on and along the rectilinear tubular member, and the movable means may comprise a movable rack gear member, a stationary rack gear member and a pinion gear disposed between and meshed with both movable and stationary rack gear members, with the movable rack gear member having the hook means fixed on one end portion thereof, and with the pinion rack gear member being connected to the movable block member of drive element. Such pinion-rack arrangement yields a double stroke motion effect to the movable rack gear member by a small amount of movement of the movable block member of drive element, while making compact and small the whole body of the hitching means.

Any other various features and advantages of the present invention will become apparent from reading of the detailed descriptions hereinafter, with reference to the drawings.

DETAILED DESCRIPTION OF PREFERRED EMBODIMENT OF THE INVENTION

Figure 2:
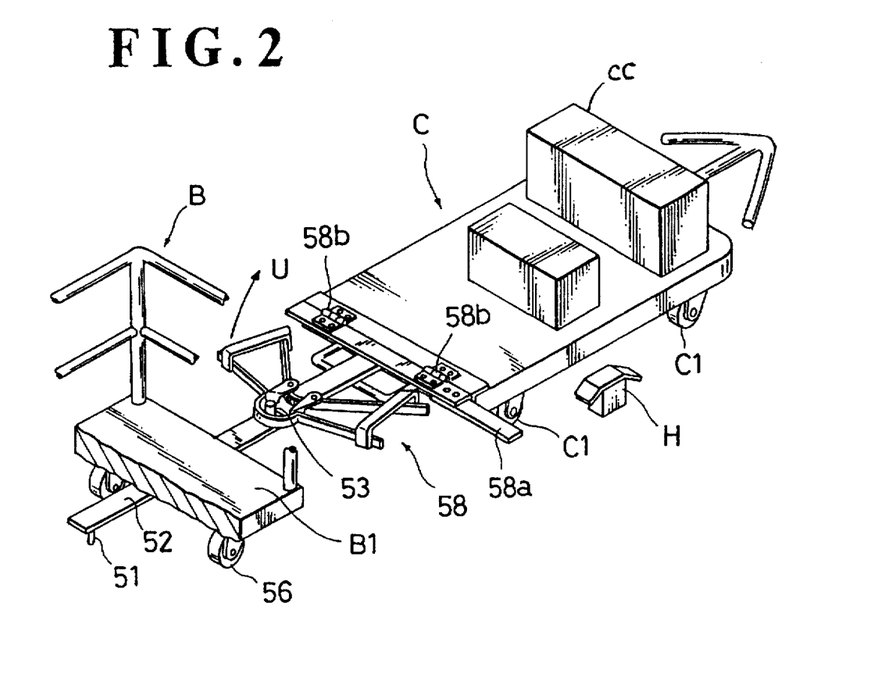
FIG. 2 is a partly broken, schematic perspective view of a carrying truck and a self-propelled truck coupled therewith.

FIG. 1 schematically shows a system in accordance with the present invention, which is so designed that when a carrying truck (B) is uncoupled from a self-propelled truck (C) it will change its direction towards one of two different storage areas (F1)(F2) and then be brought thereto. According to the system, there are included self-propelled and carrying trucks (C)(B) to transfer articles or goods in an unmanned, automated way to a certain destination (not shown). Briefly stated, referring to FIG. 2, the self-propelled truck (C) has a computerized control device (CC) including a sensor which detects a guiding tape (9) fixed on the passage (P), so that the truck (C) itself will move automatically along the passage (P). The truck (C) includes casters (C1), driving wheels (C2) and also a female coupling member (58) disposed behind the backward side thereof. The female coupling member (58) is hingedly connected via two hinges (58b)(58b) to the backward side of truck (C) such as to be vertically rotatable relative to the hinges (58b). The driving wheels (C2) are controlled by the device (CC) to move, stop or turn the self-propelled truck (C) at a predetermined point. Additionally, an uncoupling means is provided with such self-propelled truck, which comprises an uncoupling plate member (58a) integral with the female coupling member (58) and an uncoupling block member (H). On the other hand, the carrying truck (B) includes casters (56) and a male coupling member (52). As shown in FIG. 2, that male coupling member (52) is fixed to the reverse side of its load-carrying platform (B1), such that one end thereof projects from the forward side of truck (B), terminating in a free end on which is provided an upwardly projected engagement pin (53) to be engaged with the foregoing female coupling member (58) of the self-propelled truck (C). Another end of the male coupling member (52) is located beneath the platform (B1), having a downwardly projected engagement pin (51) for a particular purpose to be described later.

The carrying truck (B) is shown in FIG. 2 to be coupled with the self-propelled truck (C), with the male engagement pin (53) of the former (B) being engaged in the female coupling member (58) of the latter. But, as understandable from the same FIG. 2, when the uncoupling plate member (58a) of the self-propelled truck (C) rides on the block member (H), the female coupling member (58) is moved upwardly as indicated by the arrow (U) and released from the engagement with the male coupling member (53, 52) of the carrying truck (C), thereby uncoupling the carrying truck (B) from the self-propelled truck (C).

Those mechanical structure and actions of truck system are known and may be more understood from the U.S. Pat. No. 5,350,077 and U.S. patent application Ser. No. 74,963, the inventions of which are made by Takashi Nezu et al. Thus, any further explanation thereon is unnecessary.

Now, turning back to view of FIG. 1, the system according to the present invention is basically comprised of: a first storage area (F1); a second storage area (F2); a direction change device (A) for changing the direction in which the carrying truck (B) travels on the path (P), toward one of the first and second storage areas (F1)(F2); and a truck hitching device (D) for hitching and drawing the carrying truck (B) to the second storage area (F2).

As shown in FIG. 1, the first storage area (F1) is defined outside of the path or passage (P) in the form of a block extending in a direction orthogonal with the longitudinal line of the passage (P), whereupon a 90-degree angle relation is established between the storage area (F1) and passage (P). In that area (F1), another truck hitching device (G) is provided, which is however not the subject matter of the present invention.

The second storage area (F2) is also defined outside of the passage (P), but is situated at a narrow zone between the first storage area (F1) and passage (P) as stated above. As shown, this particular area is so located as to orient in a direction extending through the point of intersection where the longitudinal line of the first storage area (F1) intersects that of the passage (P), the intersection point being thus located at the center of the passage (P).

Disposed at such intersection point is the direction change device (A), whereas in the second storage area (F2), the truck hitching device (D) is provided, thus constituting a principal arrangement of the present invention. In the embodiment shown, the second storage area (F2) is disposed at the angle of 45 degrees with respect to the position of the truck hitching device (D).

Figure 3:
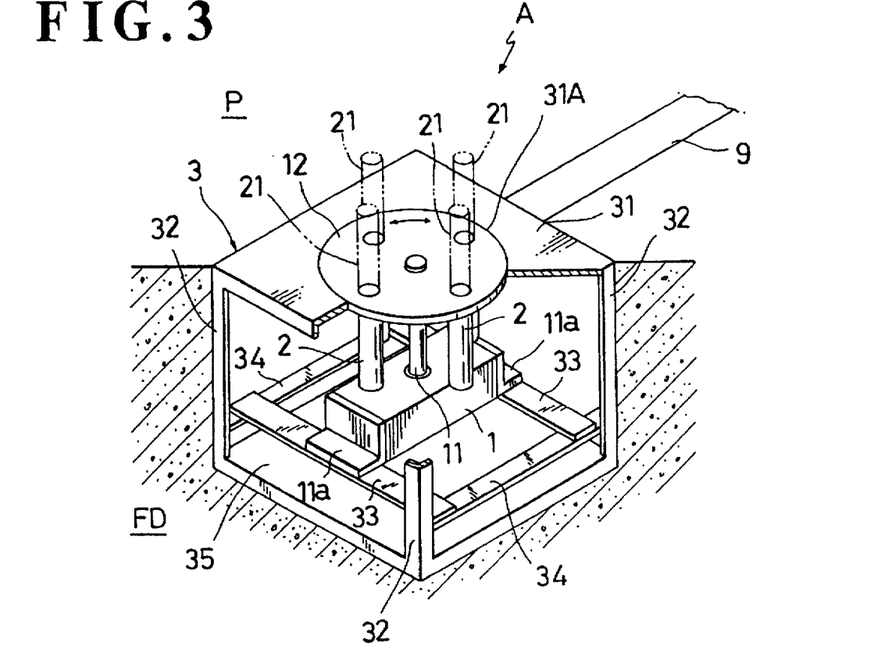
FIG. 3 is a partly broken, schematic perspective view of a direction change device forming one of the principal parts of the present invention.
Figure 4:
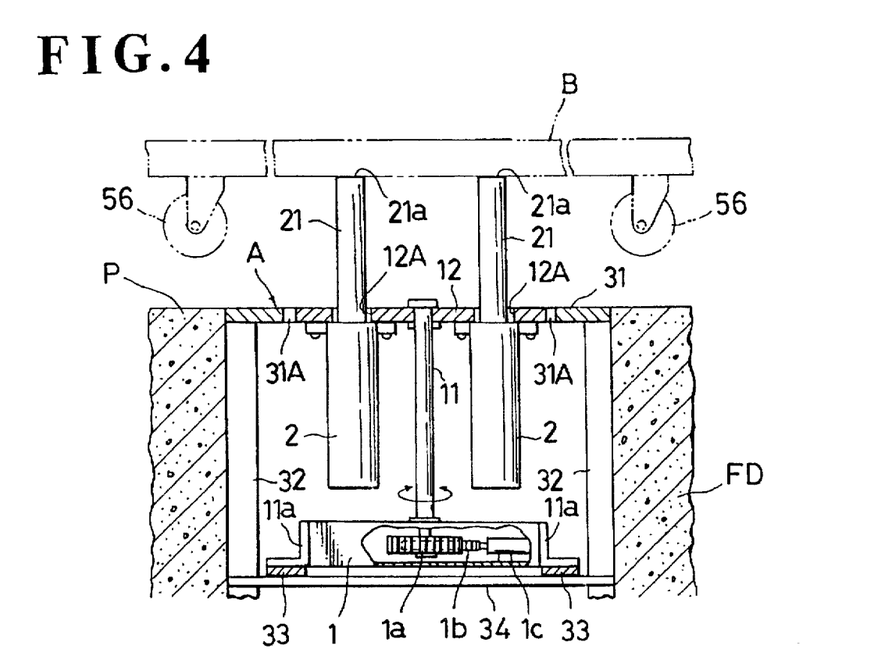
FIG. 4 is a schematic sectional view of the direction change device, showing the same to raise the carrying truck.

Referring to FIGS. 3 and 4, the direction change device (A) comprises a boxy frame (3), a drive source (1) supported in the frame (3), a rotary disc member (12) connected to the shaft (11) of the drive source (1), and a plurality of pneumatic cylinders (2) (or four cylinders as in FIG. 3) and a plurality of elevating rods (21), each being mounted in the respective cylinders (2) in a vertically movable way.

As in FIG. 3, the boxy frame (3) is bodily embedded in the underground (FD) of the passage (P), with its upper wall (31) being exposed therefrom in registry with the flat surface of passage (P).

The boxy frame (3) is formed by an upper flat square wall (31), a lower flat square wall (35) and four corner pillar sections (32) extended between those two square walls (31)(35), all in an integral manner. A circular hole (31A) is perforated in the center of the upper wall (31).

Designations (33) and (34) denote a pair of first support members and a pair of second support members, respectively. They are disposed within and downwardly of the boxy frame (3) such as to be fixed to the lower end portions of the pillar sections (32). Otherwise stated, as shown in FIG. 3, the two second support members (34) are fixed to one set of the two pillar sections (32) and another set of the two pillar sections (32), respectively, such as to be in an opposed facing and parallel relation with each other. On the other hand, the two first support members (33) are fixed upon both two second support members (34), extending therebetween in a spaced-apart parallel relation with each other.

The drive source (1) is shown to be disposed within and centrally of the boxy frame (3). Namely, the drive source (1) is fixedly mounted midway upon both two first support members (33)(33), bridging thereover, by means of two L-shaped brackets (11a)(11a). A drive shaft (11) extends upwardly from the upper surface of the drive source (1), terminating in an upper end, to which the rotary disc member (12) is fixedly connected at its center of rotation. In the illustrated embodiment, as in FIG. 4, the drive source (1) is composed of a cylinder (1c), a rack gear (1b) connected to the cylinder (1c) and a pinion gear (1a) secured to the lower end of the drive shaft (11), the pinion gear (1a) being in a meshed engagement with the rack gear (1b). Thus, to operate the cylinder (1c) will cause a linear motion of the rack gear (1b) to rotate the pinion gear (1a) in normal or reverse direction, whereby the drive shaft (11) may be rotated in the likewise direction to turn the disc member (12) normally or reversely as indicated by the arrows in FIGS. 3 and 4.

The rotary disc member (12) is disposed on a plane flush with the upper flat wall (31) of the boxy frame (3).

As best seen in FIG. 4, four pneumatic cylinders (2) are fixed to the reverse side of that rotary disc member (12) in an equidistant relation with one another relative to the drive shaft (11). An elevating rod (21) extends upwardly from each of the four cylinders (2) and passes through each of four through-holes (12A) formed in the disc member (12). Actuation of the cylinders (2) causes the elevating rods (21) to be raised to a lifting position where the carrying truck (B) is to be lifted up from the passage (P) as will be described, or lowered down to an inoperative position where the upper ends (21a) of all the elevating rods (21) are to be positioned on a plane flush with the flat upper surface of disc member (12) as can be seen in FIG. 3.

As understandable from 1, the thus-constructed direction change device (A) is located on the passage (P) in the neighborhood of an uncoupling position where the self-propelled truck (C) is stopped and uncoupled from the carrying truck (B). According to the present embodiment, the first storage area (F1) is situated in correspondence with the direction change device (A) and at a right angle therewith, while the second storage area (F2) is so situated adjacently between the first storage area (F1) and passage (P) as to orient at 45-degree angle towards the direction change device (A).

Figure 5:
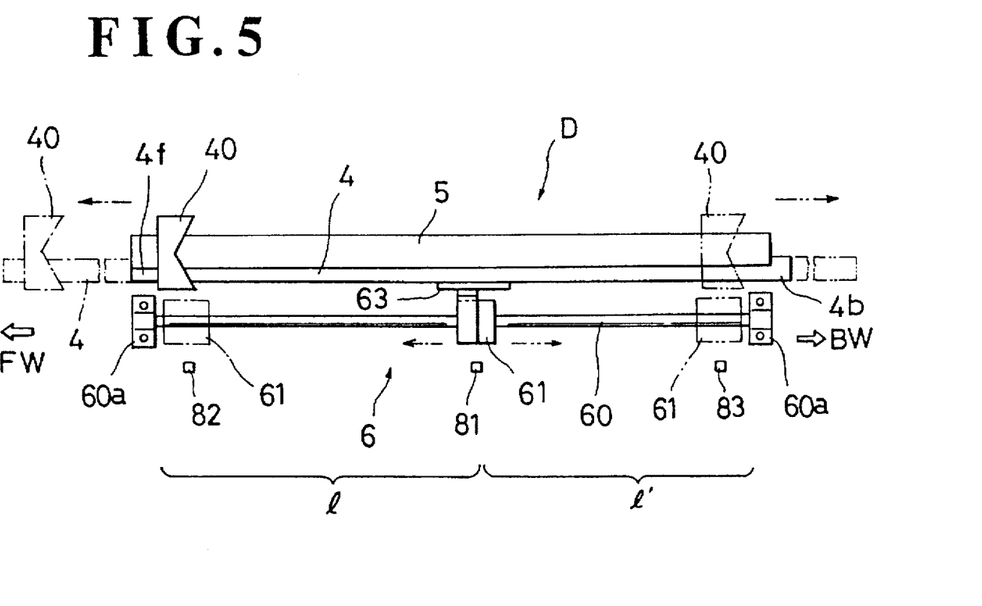
FIG. 5 is a schematic plan view of a truck hitching device forming one of the principal part of the present invention, which explanatorily shows its actions.
Figure 6:
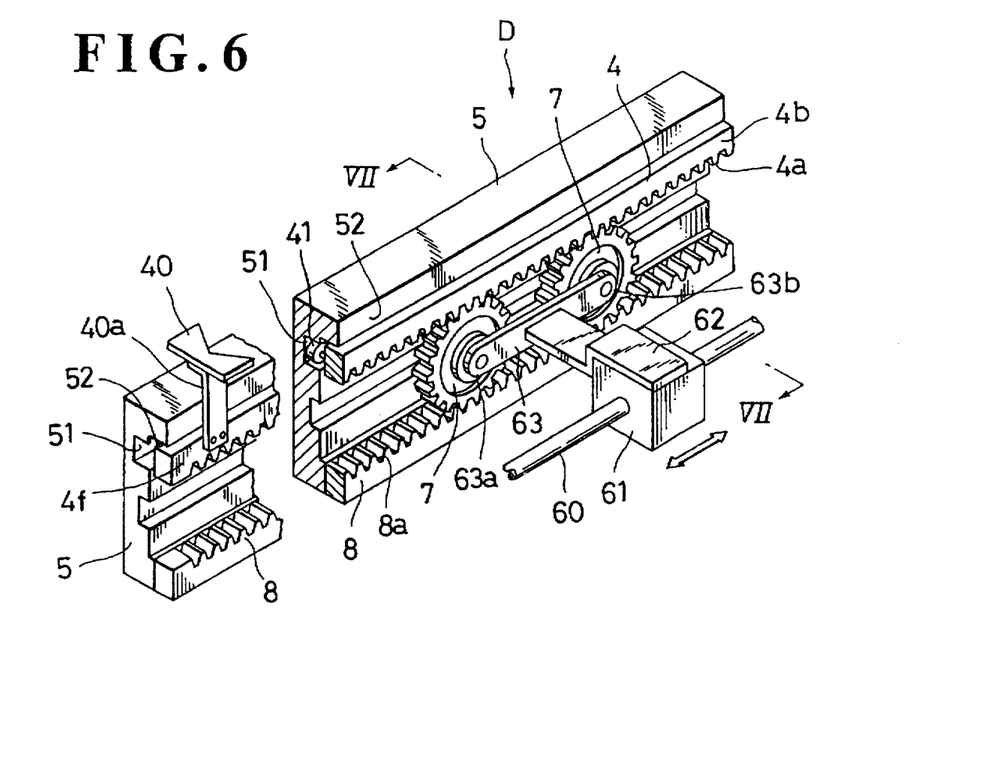
FIG. 6 is a partly broken, schematic perspective view of the truck hitching device.
Figure 7:
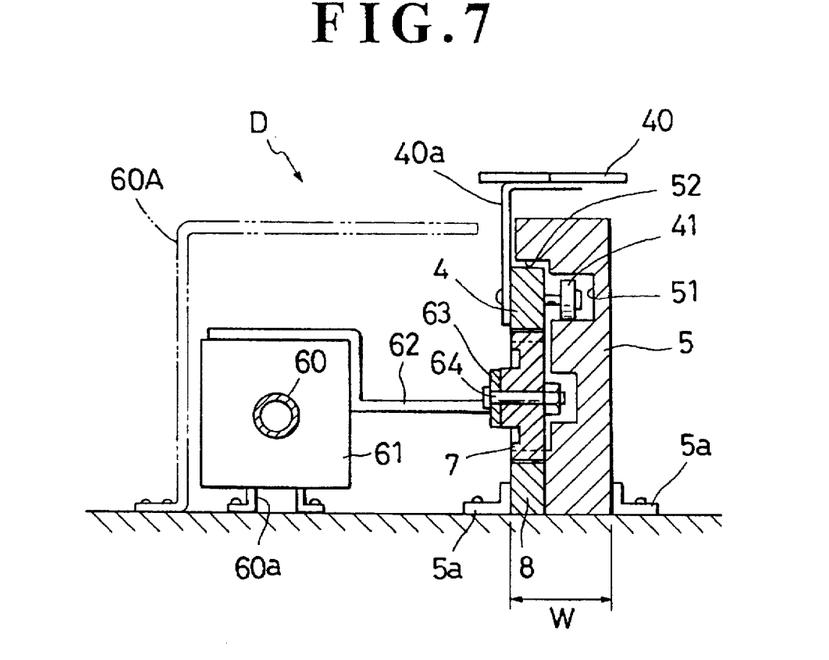
FIG. 7 is a sectional view taken along the line VII—VII in the FIG. 6.

Reference is now made to FIGS. 5 to 7. In those figures, there is illustrated the truck hitching device (D) disposed in the foregoing second storage area (F2). The truck hitching device (D) includes a hook member (40) movably provided at the forward end thereof facing the direction change device (A). As will be described, the hook member (40) may be moved toward a carrying truck (B) stopped at the direction change device (A) in order to draw the same therefrom to a predetermined storage point.

As best seen from FIG. 6 in conjunction with FIG. 5, the truck hitching device (D) comprises: a guide base member (5); a fore-and-aft moving drive element (6) of a so-called "rod-less cylinder" type; a stationary rack gear member (8) fixed to the lower end of the guide base member (5); a movable rack gear member (4) slidably fitted in the upper end of the same base member (5); a hook member (40) fixed to the forward end portion (4f) of the movable rack gear member (4); and a pair of pinion gears (7)(7) which are in a meshed engagement with both movable and stationary rack gear members (4)(8).

The guide base member (5) is formed from a rigid elongated plate material as shown, having a certain length and thickness (W)(see FIG. 7). As viewed from FIG. 7, the guide base member (5) is also so formed to have a certain height-wise width, erecting from the floor, and have a generally inverted-L-shaped cross-section, wherein a horizontally extending upper flange portion (52) is integrally formed in and along the upper end of the base member (5) per se, such as to project from one lateral side thereof, and also, at the same lateral side of base member (5), a recessed guide groove (51) is formed adjacent to the flange portion (52), extending along the upper portion of the same base member (5). As shown, both flange portion (52) and guide groove (51) extend in parallel with each other through the whole length of base member (5)

As in FIG. 7, the thus-formed base guide member (5) is fixed, at its lower end side, to the floor by means of brackets (5a).

The movable rack gear member (4) is of a length generally equal to the whole length of the guide base member (5), but may be increased in length as desired, considering a distance between the present truck hitching device (D) and the carrying truck (C) stopped at the direction change device (A) as will be stated later. A plurality of gear teeth (4a) are formed in the bottom side of the movable rack gear member (4) along the whole length thereof. Further, a plurality of guide rollers (41) are provided rotatably on one lateral side of the same rack gear member (4), though not shown clearly.

The stationary rack gear member (8) is fixed as by welding to the lower end of the guide base member (5) in an opposed facing relation with the flange portion (52) of same base member (5) as shown in FIG. 6. The whole length of that rack gear member (8) is equal to that of the base member (5).

The movable rack gear member (4) is movably set along and beneath the flange portion (52) of guide base member (5), with the plural guide rollers (41) being fitted in the recessed groove (51) in a rolling contact therewith.

As mentioned earlier, a hook member (40) having a valley-like engagement portion (as best seen in FIG. 6) is secured firmly to the forward end portion (4f) of movable rack gear member (4) by means of a rigid bracket (40a) in such a manner as to be positioned a certain distance above the guide base member (5).

Of course, both stationary and movable rack gear members (8)(4) as well as the hook member (40) should be made of a proper rigid material for the purpose of hitching and drawing the carrying truck (B) to the second storage area (F2).

A pair of movable pinion gears (7)(7) are interposed between the stationary and movable rack gear members (8)(4) such that the upper and lower parts of pinion gears (7) are each meshed with the respective teeth (8a)(4a) of those two rack gear members (8)(4). The two pinion gears (7) are shown to be connected together and spaced apart from each other by means of a connecting plate member (63) on a rectilinear line along the longitudinal directions of both rack gear members (4)(8). Forward and backward ends (63a) (63b) of the connecting plate member (63) each support the respective centers of rotation of pinion gears (7), thus permitting the pinion gears (7) to be rotatable freely. Accordingly, in this particular pinion and rack gear construction, the two movable pinion gears (7) are rotatable and displaceable upon the stationary rack gear member (8) forwardly and backwardly in the longitudinal direction thereof, to thereby cause the movable rack gear member (4) to be moved along the guide base member (5) in the forward and backward directions at the same time.

The fore-and-aft moving drive element (6) may comprise a so-called "rod-less cylinder" wherein a movable block member (61) is moved on and along a tubular member (60) under a controlled magnetic force. This is a known state of art, and although not shown, in brief, this sort of drive element includes one array of plural permanent magnets disposed in one of the slide block member (61) and tube cylinder (60), and another array of plural electromagnetic pieces disposed in another of them. Using a proper electronic control circuitry and elements, a repulsive force produced between those two arrays of different magnetic substances may be controlled to cause a fore-and-aft linear motion of the slide block member (61) along the tubular member (60). At any rate, in accordance with the present invention, the drive element (6) may be constructed in any other suitable way, insofar as the movable block member (61) is set within the length of the tubular member (60) and may travel therealong as indicated in FIG. 5.

The fore-and-aft moving drive element (6) is disposed alongside of the guide base member (5), such that the tubular member (60) extends in parallel therewith. The tubular member (60) has a length equal to the whole length of guide base member (5) and is supported firmly on the two support brackets (60a) (60a) fixed on the floor. The movable block member (61) is connected, via a connecting bracket (62), to the connecting plate member (63) provided at the two pinion gears (7). Thus, upon the actuation of the drive element (6), the movable block member (61) may be translated along the tubular member (60) in the forward and backward directions, which in turn causes the two pinion gears (7) to be displaced simultaneously in the likewise directions along both stationary rack member (8) and guide base member (5), whereby the movable rack gear member (4) in mesh with the pinions (7) may be moved in the fore-and-aft direction as indicated by the one-dot and two-dot chain lines in FIG. 5.

It is appreciated that such pinion-rack mechanism of drive element (6) yields a double stroke reciprocal motion to the movable rack gear member (4). That is, reference being made to both FIGS. 5 and 6, it will be understandable mechanically that, upon the movable block member (61) being moved in the forward direction (FW), for instance, a corresponding forward force is applied to the respective rotation centers of the two pinion gears (7), as a point of force, and then, a forward action is exerted on an upper meshed point where an upper part each of the pinions (7) is meshed with the teeth (4a) of movable rack member (4), in relation to a fulcrum defined at a lower meshed point where a lower part each of the pinions (7) opposite to said upper part is meshed with the teeth (8a) of stationary rack member (8). Thus, suppose that the foregoing point of force is displaced a distance of one, then the point of such forward action will be displaced a distance of two, i.e. twice ahead of that force point, which means that a double stroke can be attained for the movable rack gear member (4) through a small amount of displacement of the movable block member (61). In that sense, the movable block member (61) should normally be positioned at a midpoint on the tubular member (60), as shown in FIG. 5, thereby leaving an equal half distance (l)(l') on the opposite sides thereof, so that, in any of forward and backward directions (FW)(BW), once the block member (61) moves at such half distance (l or l'), the movable rack gear member (4) moves twice as far as the block member (61) moves, to reach a given point. This is understandable from comparative view between FIGS. 5 and 8. In those figures, it can be observed that one stroke of forward or backward movement of the block member (61) results in yielding a generally double stroke of the movable rack gear member (4) in the corresponding forward or backward direction.

Although not shown, the movable block member (61) may be controlled as to its forward and backward movements and stops through a proper computerized system and position detecting means associated electrically therewith. In particular, as such position detecting means, there are provided a central sensor (81), a forward sensor (82) and a backward sensor (83) in order to stop the movable block member (61) at a predetermined position in the forward and backward directions (FW)(BW), as can be seen in FIG. 5. Namely, the central sensor (81) is disposed at a point corresponding to the midpoint of the tubular member (60), whereas the forward and backward sensors (82)(83), are disposed respectively at a forward point corresponding to the forward end portion of tubular member (60) and at a backward point corresponding to the backward end portion of the same (60). In a normal condition, a computer (not shown) instructs the drive element (6), in cooperation with the central sensor (81), to position the block member (61) at a central point as indicated by the solid line in FIG. 5. In the case where the block member (61) moves in the forward direction (FW) and reaches the forward end portion of tubular member (60), the forward sensor (82) detects the block member (61) and sends a signal to the computer, which instructs the drive element (6) to stop the block member (61) at a forward limit point as indicated by the one-dot chain lines in FIG. 5. In that case, of course, the movable rack gear member (4) is displaced forwardly to bring the hook member (40) to the truck hitching device (A) as in FIG. 8. On the contrary, if the block member (61) moves in the backward direction (BW) and reaches the backward end portion of tubular member (60), the backward sensor (83) detects the block member (61) and sends a signal to the computer. Then, the drive element (6) is instructed by the computer to stop the block member (61) at a backward limit point as indicated by the two-dot chain lines in FIG. 5, with the result that the movable rack gear member (4) is displaced backwardly to bring the hook member (40) to the predetermined second storage area (F2) as in FIG. 8.

As constructed above, the truck hitching device (D) is made much compact and minimized in both size and number of parts, because most of movable parts and associated elements (4, 7, 40, 63) are assembled in a vertically piled fashion within the width-wise thickness (W) of the guide base member (5), and the fore-and-aft moving drive element (6) is disposed adjacent and alongside the guide base member (5). Thus, the truck hitching device (D) can be installed in such narrow storage area (F2), without taking up room there.

Designation (60A) indicates a cover member which may be provided for covering the fore-and-aft moving drive element (6) to protect it against accidental contact with the carrying truck (B) and also against invasion of dust thereinto.

It is noted that the computerized control circuitry and associated electronic elements (not shown) for operating the direction change device (A) and truck hitching device (D)

are contained in the console (E) (see FIG. 1), and that the console (E) is connected electrically with all the actuators (1, 2, 6) in those devices (A)(D), though not shown. The console (E) is provided with a sensor (El) for detecting the self-propelled truck (C) coupled with the carrying truck (B), so that, responsive to the sensor (El) detecting the truck (C), the computer in the console (E) will actuate the direction change device (A) and thereafter actuate the truck hitching device (D), in this sequence. Although not shown, the self-propelled truck (C) also has a sensor which detects the console (E) and is programmed to stop at a predetermined point in the passage (P) upon detection of that console (E). In this regard, before the truck (C) reaches such stop point, its uncoupling plate member (58a) rides on the block member (H), thereby raising the female coupling member (58) to release its engagement with the male coupling member (52, 53) of the carrying truck (B) to complete uncoupling of the carrying truck (B) from the self-propelled truck (C). Thus, it is after such uncoupling of carrying truck (B) that the sensor (E1) detects the self-propelled truck (C) and sends a signal to the computer of console (E) for operation of those direction change and truck hitching devices (A)(D).

Now, description will be made of a specific operations and actions of the present system hereinafter.

Firstly, as shown in FIG. 1, when the self-propelled truck (C) trailing the carrying truck (B) therebehind reaches a stop point in the passage (P) where the console (E) lies adjacently, the carrying truck (B) is uncoupled from the self-propelled truck (C) as the uncoupling plate member (58a) of the latter (C) rides up on the block member (H) to disengage the associated female coupling member (58) from the male coupling member (52, 53) of the carrying truck (B). Shortly after then, the self-propelled truck (C) automatically stops there. At this moment, the carrying truck (B) is positioned at a given point where the direction change device (A) lies under the platform body of carrying truck (B). Then, the sensor (El) detects the self-propelled truck (C), sending a signal to the computer (not shown) which instructs the direction change device (A) to firstly actuate the cylinders (2) so as to extend their respective elevating rods (21) upwardly towards the carrying truck (A), thereby raising the same to the degree that its casters (56) are brought upwards out of contact with the floor, as indicated by the arrow (1̂) in FIG. 8. Next, the drive source (1) of the direction change device (A) is operated to turn the rotary disc member (12) by 45 degrees, together with both cylinders (2) and elevating rods (21), in a direction towards the second storage area (F2) where the truck hitching device (D) lies, as shown in FIG. 9. Consequently, the carrying truck (B) raised by the elevating rods (21) is turned and oriented towards the truck hitching device (D), changing its direction from the passage (P) towards the second storage area (F2).

Then, under computerized control of the console (E), the truck hitching device (D) is instructed to actuate its fore-and-aft moving drive element (6) to rotate and displace the pinion gears (7) in the forward direction (FW) along the stationary rack gear member (8), thereby displacing and projecting the movable rack gear member (4) from the guide base member (5) towards the carrying truck (B). As discussed above, the movable rack gear member (4) is subject to the double stroke motion and therefore moves twice as far as both pinion gears (7) and block member (61) move. Hence, the movable rack gear (4) is extended to reach the carrying truck (B) even by a small amount of displacement of the block member (61), with the forward end (4f) of movable rack gear member (4) positioned under the carrying truck (B), as can be seen from FIG. 8. At this stage, in the drive element (6), the block member (61) moves along the tubular member (60) from the central point where the central sensor (81) exits towards a forward limit point where the forward sensor (82) exits. When the block member (61) reaches the forward limit point, the forward sensor (82) detects such arrival, sending a signal to the computer in the console (E), and the computer instructs the block member (61) to stop there, so that the movable rack gear member (4) is also stopped, with its forward end (4f) being located under the carrying truck (B).

Figure 8:
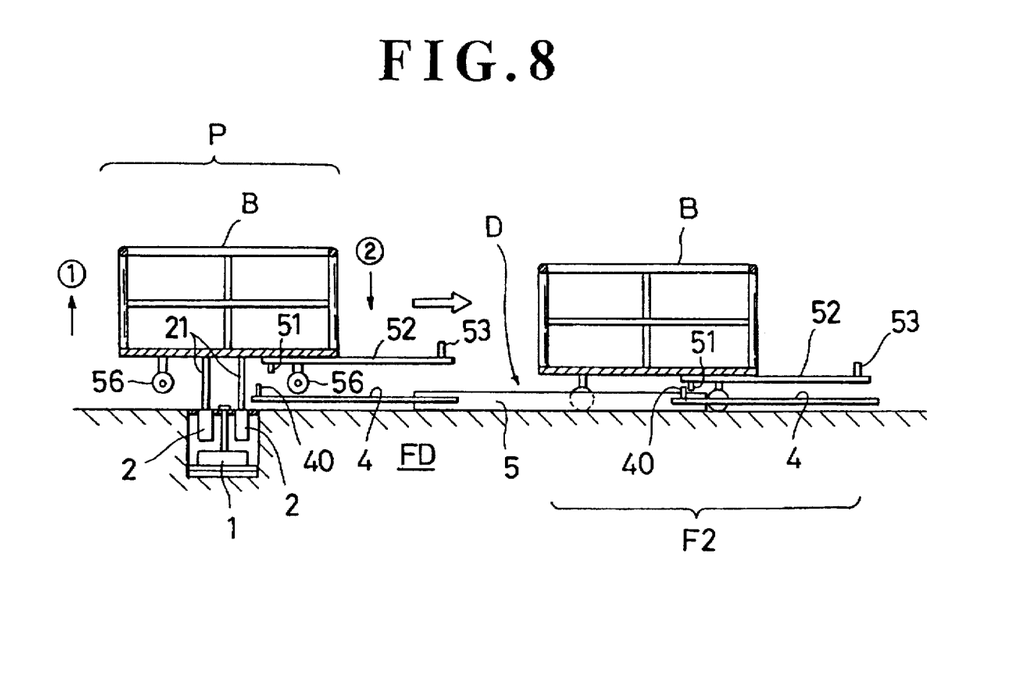
FIG. 8 is a diagram showing that the carrying truck is hitched and drawn by the truck hitching device to a second storage area.
Figure 9:
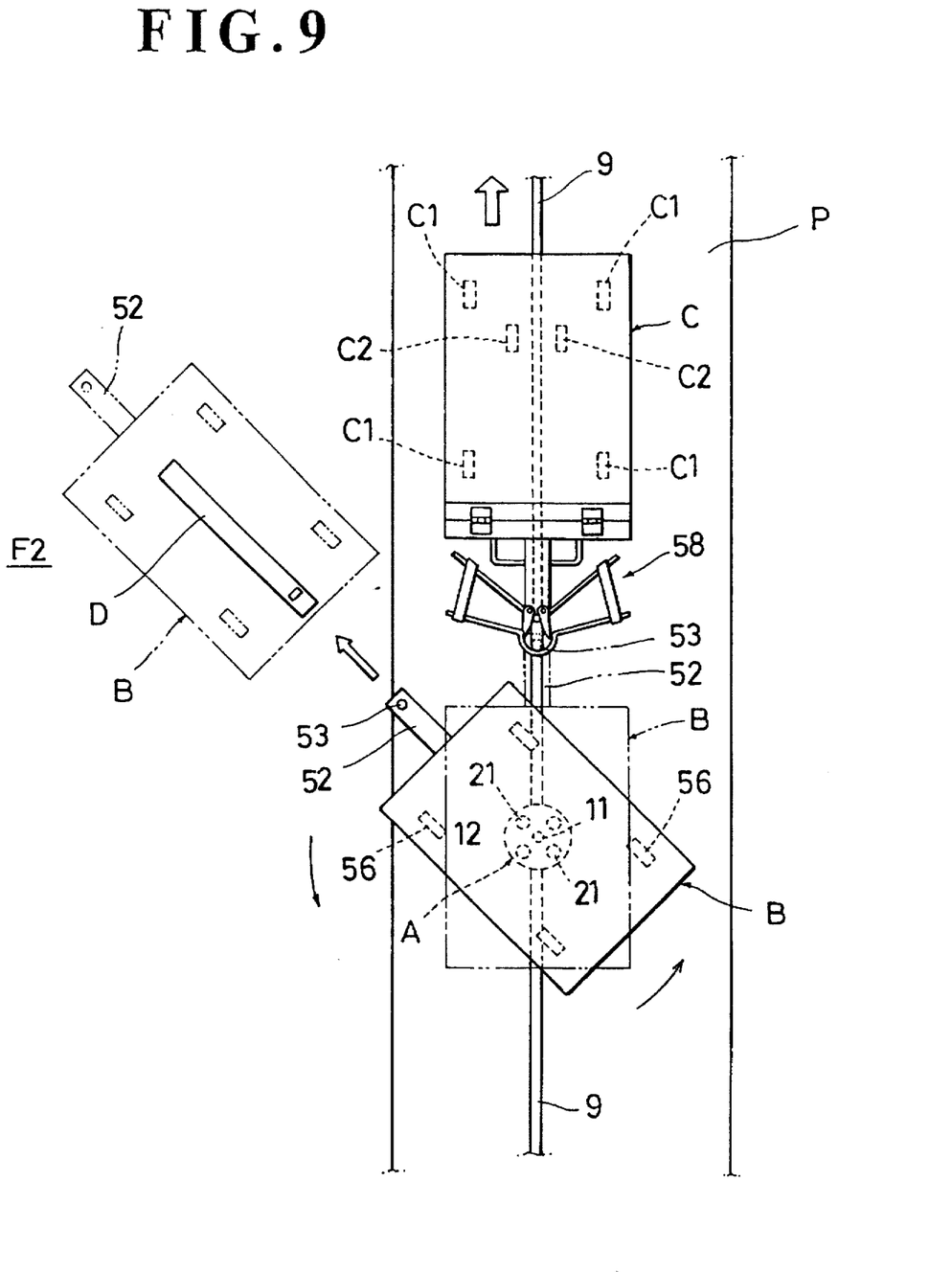
FIG. 9 is a schematic plan view of the system, which explanatorily shows a first example of operation where the carrying truck is uncoupled from the self-propelled truck and is oriented and hitched by the truck hitching device towards the second storage area defined at 45-degree angle relative to a passage.

Upon the forward sensor (82) detecting the arrival of block member (6) to the forward limit point, the movable rack gear member (4) is stopped at once, with its forward end (4f) positioned under the carrying truck (B), as in FIG. 8. Here, it is observed that the hook member (40) on that forward end (4f) of movable rack gear member (4) is positioned under and adjacent to the downwardly projected engagement pin (51) of the carrying truck (B). Strictly stated, the hook member (40) is positioned inwardly of the truck (B) as compared with the position of the engagement pin (51), as understandable from the FIG. 8. Under this condition, the cylinders (2) of the direction change device (D) are actuated to lower their elevating rods (21) (as indicated by the arrow 2̂), causing the carrying truck (B) to land upon the floor, with its casters (56) in contact thereon, as a result of which, the engagement pin (51) of carrying truck (B) is placed in the state of being engageable with the hook member (40).

Thereafter, the truck hitching device (D) is operated to actuate its fore-and-aft moving drive element (6) to move the block member (61) from the forward limit point in a direction to the backward limit point. With this backward movement of block member (61), the movable rack gear member (4) is returned towards the guide base member (5), with the hook member (40) engaged with the engagement pin (51), whereby the carrying truck (B) is hitched or drawn towards the second storage area (F2) as shown in FIGS. 8 and 9. When the block member (61) reaches the backward limit point, the backward sensor (83) detects it and send a signal to the computer in the console (E), which instructs the drive element (6) to stop the block member (61) there, with the result that the hook member (40) completes its travel at the same backward limit point, due to the double stroke motion effect discussed above. Thus, the carrying truck (B) is brought to a predetermined storage point, as shown in FIG. 8 and as indicated by the two-dot chain lines in FIG. 9. Finally, the block member (61) of drive element (6) is automatically returned to the normal central home point in correspondence with the central sensor (81), as indicated by the solid line in FIG. 5.

It is essential that, in assembling the truck hitching device (D), the tubular member (60) is disposed adjacent to and in parallel with the guide base member (5), with both movable block member (61) and pinion gears (7) being positioned at a midpoint in both tubular and guide base members (60)(5), and the movable rack gear member (4) is so set in the guide base member (5) as to place its whole length of body generally in agreement with that of the base member (5), as indicated by the solid line in FIG. 5. This effectively minimizes the all the dimensions of truck hitching device (D) when it is inoperative.

Figure 10:
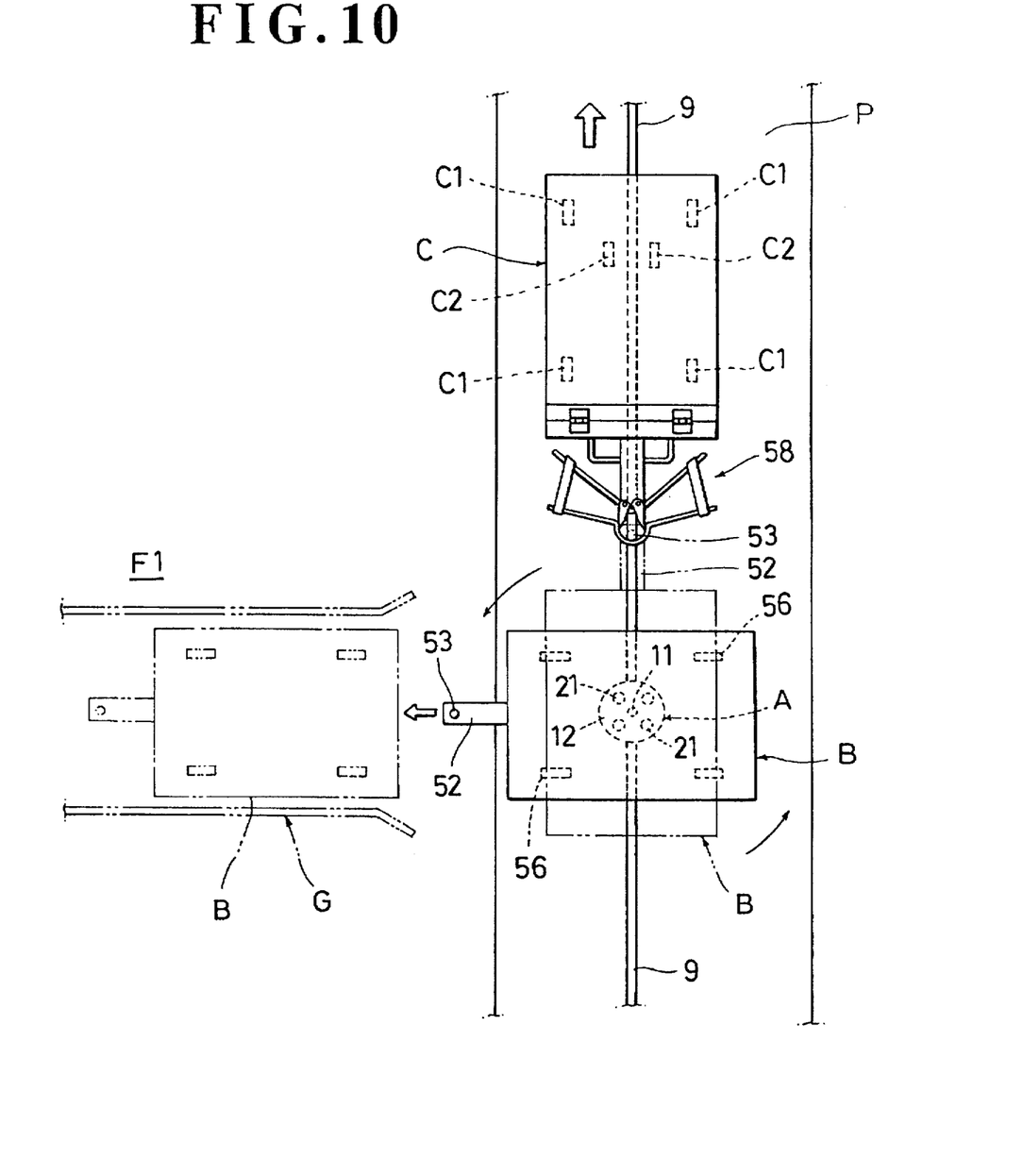
FIG. 10 is a schematic plan view of the system, which explanatorily shows a second example of operation where the the carrying truck is oriented and hitched by the truck hitching device towards a first storage area defined at 90-degree angle relative to the passage.

FIG. 10 shows the case where the direction change device (A) is operated to turn its rotary disc member (12) by 90 degrees in the direction to the first storage area (F1), so that the carrying truck (B) on the device (A) may be oriented towards the same storage area (F1).

The system thus arranged in accordance with the present invention is therefore advantageous in minimizing the size of the constituent elements and simplifying their mechanical structures, which not only permits installation of the elements in a narrow or small area, but also provides a precise storing of the carrying truck, with less failure and malfunction. Particularly, the direction change device (A) is embedded in the passage (P) and normally no projected part is found from the device (A), except that the elevating rods (21) thereof will project from the passage (P) only for the purpose of raising the carrying truck (B). Thus, there is no interference of the device (A) with both self-propelled and carrying trucks (C)(B). Further, needles to mention, the carrying truck uncoupled from the self-propelled truck may be automatically changed in its direction from the passage towards a differently angular storage area disposed outside the passage and brought thereto in a completely unmanned manner, without requiring the hands of workers as found hitherto in the art.

While having described the present invention, it should be understood that the invention is not limited to the illustrated embodiments, but any other modifications, replacements and additions may be structurally applied thereto without departing from the scope of the appended claims.

What is claimed is:

1. A system for storing a carrying truck uncoupled from a self-propelled truck, wherein the carrying truck may be coupled with the self-propelled truck, said system comprising a passage along which said carrying truck may travel with, and trail after said self-propelled truck coupled therewith;

an uncoupling point defined in said passage, at which uncoupling point, said self-propelled truck may be stopped and uncoupled from said carrying truck;

a storage area for storing said carrying truck, said storage area being located outside of said passage and further defined angularly relative to an axis of said passage at said uncoupling point;

a rotary direction change means disposed underground of said passage and substantially at said uncoupling point, said direction change means being operable to rotate and orient said carrying truck positioned at the rotary direction change means towards said storage area, said rotary direction change means including:

(a) a rotation surface means disposed substantially flush with an upper surface of said passage;

(b) a first drive source for causing rotation of said rotation surface means; and (c) an elevating means at a reverse side of said rotation surface means, said elevating means passing through said rotation surface means and operable vertically therethrough to raise and lower said carrying truck from and to said passage, wherein when not in operation, said elevating means is normally positioned at a level substantially flush with said rotation surface means;

and a hitching means provided with an engagement means for engagement with said carrying truck, said hitching means being disposed at said storage area and operable to extend said engagement means toward said carrying truck upon rotation thereof by said rotary direction change means, said carrying truck then being hitched and drawn via said engagement means in a direction from said rotary direction means towards said storage area.

2. The system as defined in claim 1, wherein said rotary direction change means is bodily embedded in said passage, excepting said rotation surface means, wherein said rotary direction change means includes a cylinder means having an elevating rod and wherein actuation of said cylinder means causes vertical movement of said elevating rod away from and towards said rotation surface means to thereby raise and lower said carrying truck from and to said passage.

3. The system as defined in claim 1, wherein said storage area is substantially located at an angle of 45 degrees in relation to an axis of said passage at said uncoupling point and wherein said hitching means is so disposed as to orient towards said rotary direction change means at generally the same angle of 45 degrees.

4. The system as defined in claim 1 wherein said rotation surface means comprises a rotary disc member having an upper circular flat surface flush with the upper surface of said passage, and wherein said drive source has a driving shaft connected to a center of rotation of said rotary disc member.

5. The system as defined in claim 4, wherein said rotary direction change means further comprises a frame in which said first drive source and rotary disc member are supported, said frame having a flat upper surface substantially flush with both said upper circular flat surface of said rotary disc member and said upper surface of said passage, and wherein said first drive source comprises a cylinder means and a means for transforming a motion of said cylinder means into a rotation of said driving shaft.

6. The system as defined in claim 1, wherein said engagement means of said hitching means comprises a hook-like engagement element and said carrying truck has an engagement portion to be engaged with said hook-like engagement element.

7. The system as defined in claim 1, wherein said rotation surface means comprises a rotary disc member having an upper circular flat surface flush with the upper surface of said passage, wherein said first drive source has a driving shaft connected to a center of rotation of said rotary disc member, and wherein said elevating means comprises a plurality of cylinders, each having an elevating rod, and wherein said plurality of cylinders are supported at the reverse side of said rotation surface means and disposed equidistantly relative to said driving shaft, such that said elevating rod of each of said cylinders passes through said rotary disc member to be movable vertically therethrough.

8. The system as defined in claim 7, wherein said elevating rod of each of said cylinders is normally lowered and positioned in said rotary disc member such that an upper end of said elevating rod is situated generally in registry with the upper circular flat surface of said rotary disc member.

9. The system as defined in claim 1, wherein said hitching means comprises a base member fixed in said storage area, a second drive source disposed adjacent to said base member, and a moving means having disposed thereon said engagement means for engagement with said carrying truck, said moving means being provided movably within said base member and being operatively connected to said second drive source such that actuation of said second drive source causes both said engagement means and said moving means to move in a direction towards and away from said carrying truck upon rotation thereof by said rotary direction change means, thereby engaging said carrying truck with said engagement means and drawing the same towards said storage area.

10. The system as defined in claim 9, wherein said engagement means comprises a hook-like engagement member provided at said moving means and said carrying truck is provided with an engagement projection, and wherein when said moving means is moved towards said carrying truck by the actuation of said second drive source, said hook-like engagement member is engaged with said engagement projection so that said carrying truck may be hitched and drawn by further actuation of said second drive source towards said storage area.

11. The system as defined in claim 9, wherein said engagement means comprises a hook-like engagement member provided at one end portion of said moving means and said carrying truck is provided with an engagement projection at a bottom side thereof, wherein said moving means maybe be moved by said second drive source to locate said hook-like engagement member under said carrying truck for engagement with said engagement projection, and wherein, when said moving means is moved towards said-carrying truck by the actuation of said second drive source, said hook-like engagement member is engaged with said engagement projection so that said carrying truck may be hitched and drawn by further actuation of said second drive source towards said storage area.

12. The system as defined in claim 9, wherein said second drive source of said hitching means comprises a drive element including a rectilinear tubular member and a movable block member movable on and along said rectilinear tubular, wherein said moving means comprises a moving rack gear member, a stationary rack gear member and a pinion gear disposed between and meshed with said moving and stationary rack gear members, said movable rack gear member having said hook-like engagement member fixed on one end portion thereof, and wherein said pinion rack gear member of said moving means is connected to said moving block member of said drive element.

13. The system as defined in claim 12, wherein a sensor means is provided in said hitching means, which detects a position of said moving block member in relation to said rectilinear tubular member so that said moving rack gear member may be stopped at a predetermined position with respect to said carrying truck.

14. A system for storing a carrying truck uncoupled from a self-propelled truck, wherein the carrying truck may be coupled with the self-propelled truck, said system comprising a passage along which said carrying truck may travel with, and trail after said self-propelled truck coupled therewith;

an uncoupling point defined in said passage, at which uncoupling point, said self-propelled truck may be stopped and uncoupled from said carrying truck;

a first storage area for storing said carrying truck, said storage area being defined outside of said passage and further defined at an angle intersecting said passage at said uncoupling point in said passage;

a second storage area for storing said carrying truck, said second storage area being located outside of said passage and further defined between said passage and said first storage area;

a rotary direction change means disposed underground of said passage and generally at said uncoupling point, said direction change means being operable to rotate and orient said carrying truck positioned at the rotary direction change means towards one of said first and second storage areas, said direction change means including:

(a) a rotation surface means disposed generally flush with an upper surface of said passage;

(b) a drive source for causing rotation of said rotation surface means; and (c) an elevating means at a reverse side of said rotation surface means, said elevating means passing through said rotation surface means and operable vertically therethrough to raise and lower said carrying truck from and to said passage, wherein when not in operation, said elevating means is normally positioned at a level generally flush with said rotation surface means; and, a hitching means provided with an engagement means for engagement with said carrying truck, said hitching means being disposed at said second storage area and operable to extend said engagement means toward said carrying truck upon rotation thereof by said rotary direction change means, said carrying truck then being hitched and drawn via said engagement means in a direction from said rotary direction change means towards said second storage area.

15. The system as defined in claim 14, wherein said second storage area is defined substantially at an angle of 45 degrees between said first storage area and said passage, and wherein said hitching means is disposed generally along said angle of 45 degrees to orient said hitching means toward said rotary direction change means.

* * * * *